June 23, 1942.  C. W. KELSEY  2,287,479
TILLING DEVICE
Filed Dec. 14, 1939  3 Sheets-Sheet 1

INVENTOR
Cadwallader W. Kelsey
BY
ATTORNEYS

June 23, 1942. C. W. KELSEY 2,287,479
TILLING DEVICE
Filed Dec. 14, 1939 3 Sheets-Sheet 3

INVENTOR
Cadwallader W. Kelsey
BY Duell, Kams and Mort
ATTORNEYS

Patented June 23, 1942

2,287,479

UNITED STATES PATENT OFFICE 2,287,479

TILLING DEVICE

Cadwallader W. Kelsey, Troy, N. Y., assignor to Rototiller, Inc., Troy, N. Y., a corporation of Delaware Application December 14, 1939, Serial No. 309,199

2 Claims. (Cl. 97—40)

This invention relates to a new and improved tilling device and particularly to a device of that type adapted for rotary tillage.

In the past, much effort and time has been expended in an endeavor to design and build a rotary tillage unit capable of large acreage performance and being able to treat widths of soil twice or several times that capable of treatment by the small models in general use.

Until the present invention such attempts have met with consistent failure, because of many mechanical difficulties encountered. Among these, is the fact that with large units, the support for the machine must be provided on four wheels with front and rear axles, and the tilling unit positioned behind the rear axle.

In encountering obstacles during the tilling operation it is therefore impossible to secure any yielding of the machine itself, and all of the shock must be absorbed by the unit. In the smaller models, such shock is compensated for by mounting the machine on a single axle with the power plant ahead of the axle and the tilling unit to the rear thereof. The unit is balanced in this position and a shock or blow to the tilling unit will throw the same upwardly, causing the entire machine to pivot about the axle and thus absorb a certain proportion of the shock.

In addition to the foregoing, it has been found that large driving shafts capable of tilling soil to any considerable width are subject to twisting strains and external damage through carelessness or violent contact with obstacles, so as to make maintenance of a machine employing a large shaft, very expensive.

An object of this invention is to provide a machine capable of large acreage performance in which shocks or strains on the tilling unit are cushioned and absorbed by the machine structure to a large extent.

A further object is that of providing a large acreage machine in which the difficulties accompanying a long driving shaft are obviated through the substitute of multiple units.

A still further object of the present invention is to provide a structure particularly suited for heavy duty work and in which the driving power may, for example, be supplied by a tractor or similar vehicle, having substantial torque and traction characteristics.

Another object is that of providing a structure of this type which is suitable for use over large varieties of terrain and under many soil conditions, with freedom from mechanical difficulty and which will operate for long periods of time without the necessity of repairs or replacements to the operating parts.

With these and other objects in mind, reference is had to the attached sheets of drawings in which.

Figure 1:
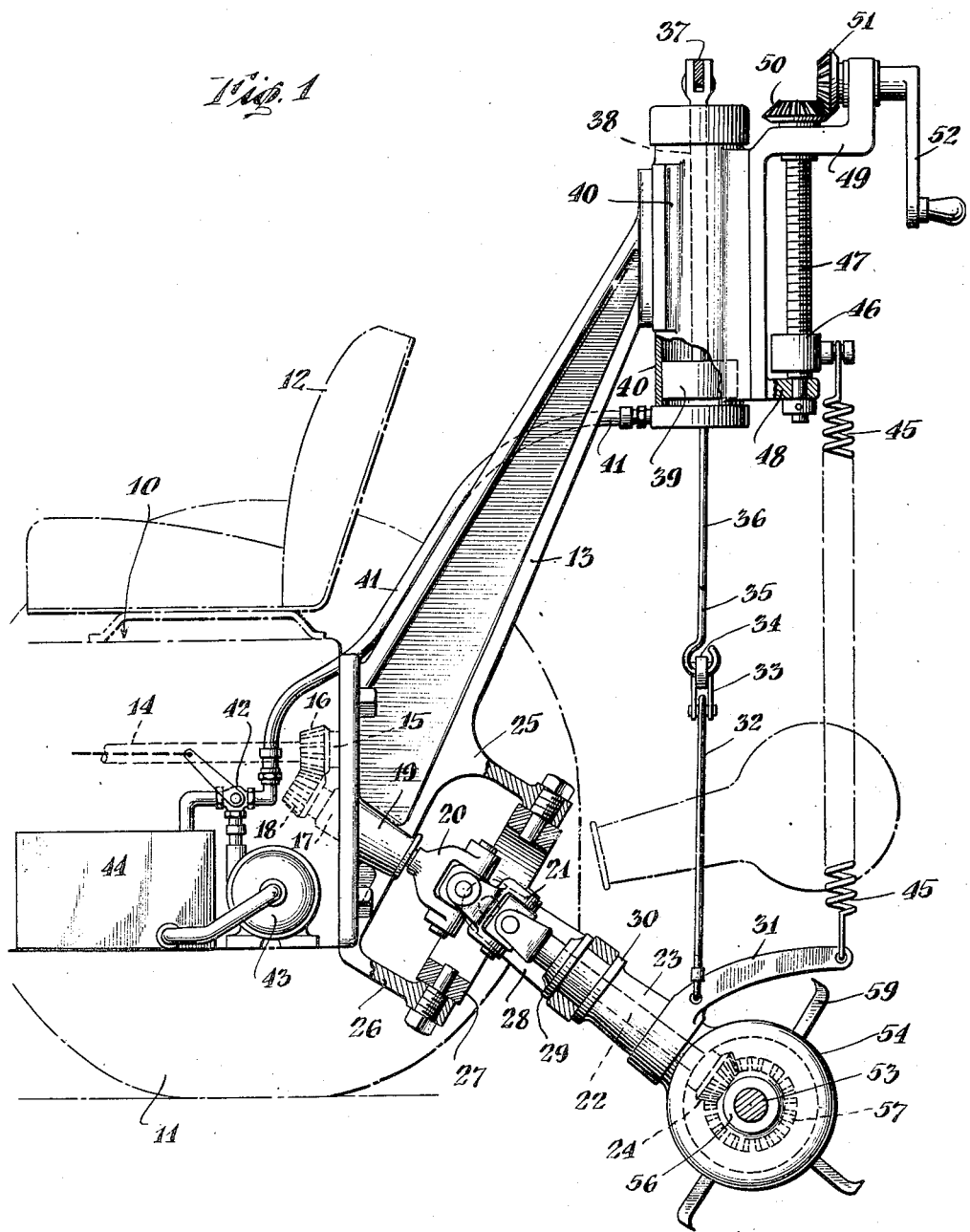
Fig. 1 is a side elevation in partial cross-section of a tilling device embodying one form of my invention.
Figure 2:
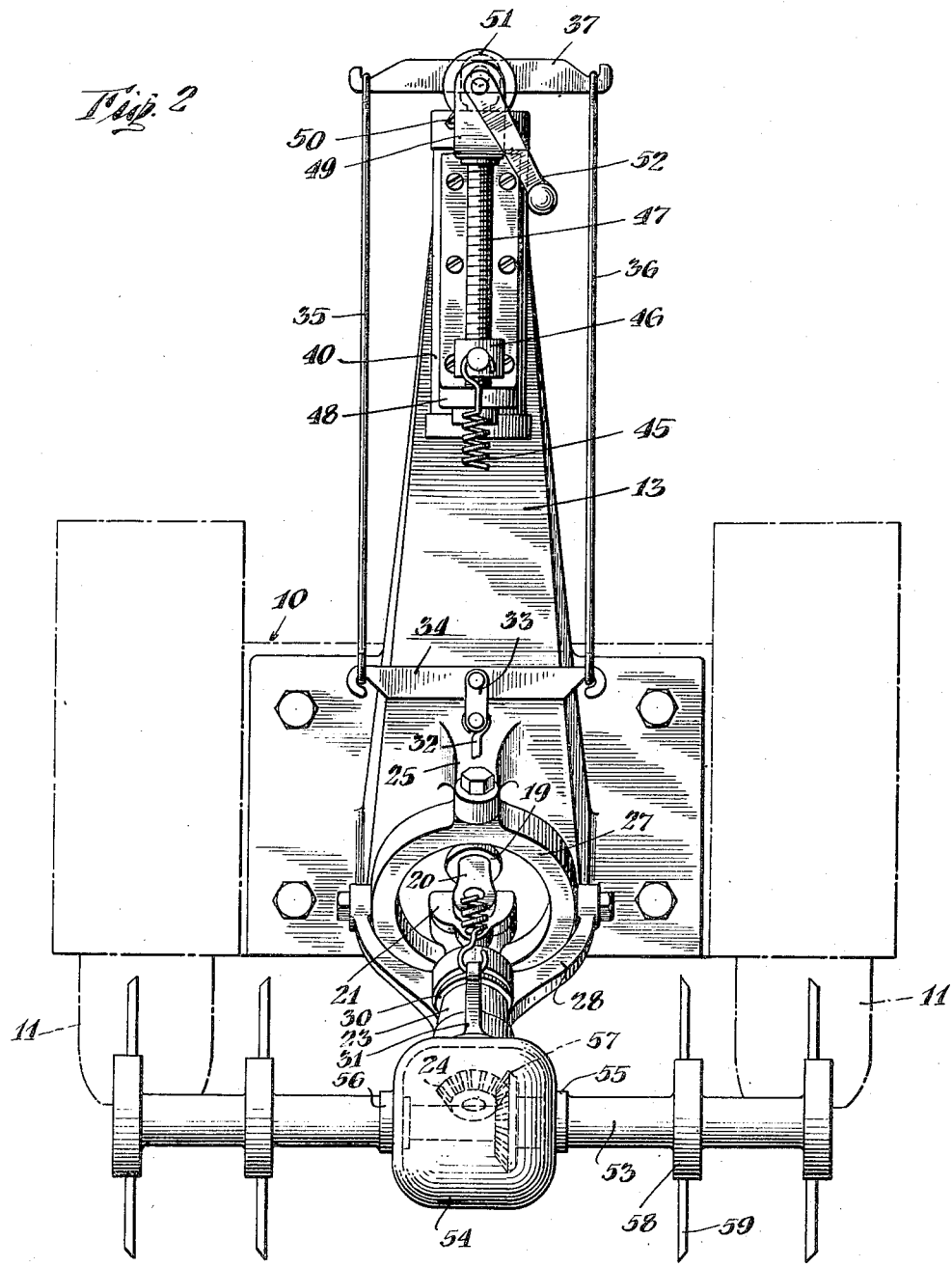
Fig. 2 is a rear elevation of the device shown in Fig. 1.

Returning now to Figs. 1 and 2 there is shown a tractor chassis 10 which is provided in the usual manner with driving wheels or the like 11 and a seat 12 for use by the operator. Secured to said chassis at the rear thereof is a strut member 13 which is in line with a driving shaft 14 associated with the tractor motor, said shaft being journaled at 15 to the inner surface of said strut member. A bevelled pinion gear 16 is carried by said driving shaft adjacent its point of journalling, and angularly disposed from said driving shaft 14 and extending downwardly therefrom is a stub shaft 17 which carries a bevelled gear 18 at its upper end, which engages the gear 16 just referred to. Shaft 17 is housed within a casing 19 forming part of the strut 13 and at its lower end is coupled to a pair of universal joints 20 and 21 arranged in close proximity to each other. Universal joint 21 is in turn coupled to a further drive shaft 22 which is housed in the casing 23 and carries the bevel pinion gear 24 at its lower end. Secured to the strut member 13 at either side of the universal joint 20 are arms 25 and 26, to which a ring 27 is bolted, or otherwise secured, for free swinging movement. The ring member is also bolted or otherwise secured to a yoke member 28 at points 90 degrees removed from the points of contact of said ring with the arms 25 and 26. The ring is thus free to swing about the axis formed by the bolts which secure the yoke 28 thereto so that in effect a joint is provided with substantially universal movement.

The yoke 28 is secured at its lower end to the casing 23 and is positioned between the two flange members 29 and 30, said yoke being thus free to rotate about said casing at its point of connection thereto. It is held against longitudinal displacement by means of said flange members. An arm 31 extends outwardly and upwardly from the lower end of the casing 23 and carries at a point near to said casing a rod 32 which extends upwardly from said arm and is connected by means of a link 33 to a cross bar 34. This cross bar has in turn two further rod members 35 and 36 secured to its outer ends and extending upwardly therefrom and into contact with a further cross bar 37.

This latter cross bar is pivotally secured to the upper end of a piston rod 38 carried by a piston 39 encased in a cylinder 40. A fluid connection 41 is provided for the lower end of said cylinder which in turn is coupled through the valve 42 to a hydraulic pump 43 and storage chamber 44. It will thus be seen that a turning of the valve 42 will allow fluid under pressure to enter into the bottom of the cylinder 40, forcing piston 39 and its attendant rod mechanism upwardly, carrying with it the driving mechanism encased in the housing 23.

A spring 45 is secured to the lower end of the arm 31 and at its upper end to the internal screw-threaded collar 46 which is carried by the screw-threaded shaft 47 mounted in brackets 48 and 49, secured to the cylinder 40. Bevelled gear 50 secured to the top of the shaft 47 cooperates with the bevelled gear 51 which is positioned at right angles thereto and which is in turn carried by the handle 52. It is apparent that turning of the handle 52 will result in the turning of the gears and shaft 47 which will raise or lower the position of the collar 46 on the shaft 47, thus increasing or decreasing the tension of the spring 45. In this fashion, the amount of energy exerted through the piston mechanism 39 to lift the tilling structure can be varied over a considerable range. The greater the tension of the spring 45 the lighter the load and vice versa.

A driven shaft 53 is carried at right angles to the shaft 22 and adjacent the lower end of the casing 23 and may be promptly secured with relation thereto by means, for example, of a straddle member 54 provided with journals 55 and 56 for supporting the shaft 53. Likewise, a bevelled gear 57 is secured to the shaft 53 and meshes with the gear 24. Tool mounts 58 are also provided on the shaft 53 and carry tools 59 suitable for soil tilling.

Figure 4:
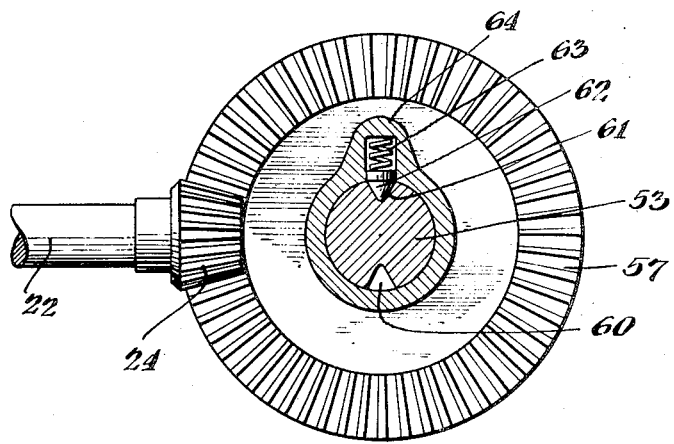
Fig. 4 is a detail in partial cross-section of the driving mechanism of the device shown in Figs. 1 and 2.

It is thus apparent that a rotation of the shaft 14 will be transmitted through the shafts 17 and 22 and their respective gear trains to the shaft 53 which in turn will impart a rotary motion to the tool members thus effectively tilling the soil. It is also apparent that great flexibility of movement is imparted to the shaft 53 by means of the unique universal mounting of the shafts and housing members so that a rock or other obstacle struck by tools located by one end of the shaft 53 will simply cause that end of the shaft to lift up and ride over the obstacle without interfering with the operation of the remainder of the shaft. In order to further safe-guard against sudden loads being placed on the driving mechanism because of the striking of a rock, root or other obstacle during cultivation, shaft 53 may, for example, be provided with wedge-shaped key ways 60 and 61 as shown in Fig. 4.

A corresponding shaped pawl member 62, spring pressed by means of a coil spring 63 may also be provided and which will ride in the housing 64 forming part of the gear 57. Tension of the spring 63 which may be pre-determined will normally hold the pawl 62 in place in either of the key ways 60 or 61, but upon the striking of an object which interferes with the rotation of a shaft 53, pressure will be exerted against the side edges of the pawl 62 so that when said pressure exceeds a pre-determined maximum, the pawl will ride upwardly against the spring 63 and allow the shaft to slip through 180 degrees of rotation until the pawl drops into the trackway 61. If the pressure has not then been relieved, such slippage will continue indefinitely.

This expedient will prevent transmission of serious shock or damage to the driving mechanism because of the striking of an obstacle during the tilling operation.

Figure 3:
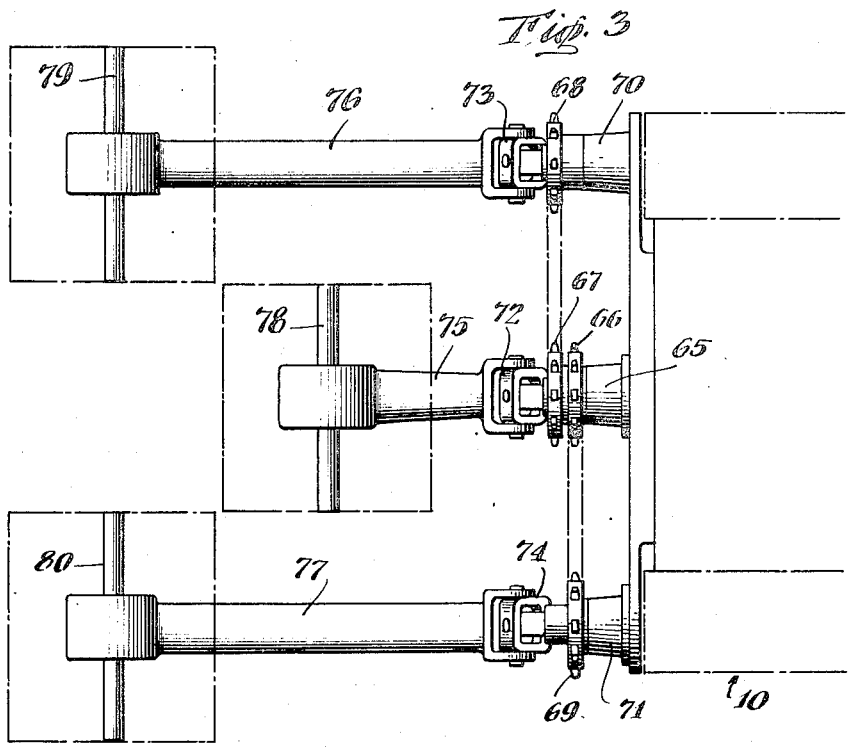
Fig. 3 is a plan view of a modified form of my invention showing one form of multiple use of my tilling device.

Turning now to Fig. 3 there is shown in schematic form a multiple arrangement of tilling device of the general type just described, which have been coupled to a tractor or other source of power. A driving shaft 65 is coupled to the motor of the tractor and may, for example, carry sprocket gears 66 and 67 which in turn are aligned with sprocket gears 68 and 69 carried by stub shafts 70 and 71 mounted at the outer ends of the rear end of a tractor. The shafts 65, 70, and 71 are additionally coupled through double universal joints 72, 73, and 74 to shafts 75, 76, and 77 which in turn are gear coupled in the manner heretofore described to driven shafts 78, 79 and 80.

It is also apparent from an examination of Fig. 3 that shaft 75, for example, is shorter than the other two shafts so that a staggered relationship of the driven shafts results. In other words, shafts 78, 79 and 80 are out of axial alignment with one another. The flexibility of such a unit over hilly or uneven terrain will be readily appreciated and it is of course apparent that instead of the three units here illustrated, a greater or lesser amount might be utilized with satisfactory results. It is apparent that in place of the sprocket gear drive, any other well-known form of driving the independent shafts from a single source of motor power may be substituted.

It is apparent that numerous rearrangements of parts can be resorted to without departing from the spirit of the invention, and no limitations are intended, unless expressly found in the claims.

I claim:

1. An apparatus of the character described comprising a frame adapted to be secured to a vehicle, a portion of said frame forming a shaft casing, a drive shaft mounted in said casing and coupled for rotation to a source of power within said vehicle, a second drive shaft for association with said first named shaft, a pair of universal joints interposed between said drive shafts and operatively connecting the same, a driven shaft mounted at right angles to said drive shafts, rotary tillage units secured to said driven shaft for rotation therewith, a casing housing said second drive shaft and a universal joint for coupling said casing to said first named casing, said universal joint being located at the position of and encircling said first named universal joints associated with said drive shafts.

2. An apparatus of the character described, comprising a frame adapted to be secured to a vehicle, a portion of said frame forming a shaft casing, a drive shaft mounted in said casing and coupled for rotation to a source of power within said vehicle, a second drive shaft for association with said first named shaft, a pair of universal joints interposed between said drive shafts and operatively connecting the same, a driven shaft mounted at right angles to said drive shafts, rotary tillage units secured to said driven shaft for rotation therewith, a casing housing said second drive shaft, a universal joint for coupling said casing to said first named casing, said universal joint being located at the position of and encircling said first named universal joints associated with said drive shafts, and means carried by said vehicle and associated with said second casing member for lifting said driven shaft and rotary tillage units vertically, whereby said drive shafts and said casing members will assume angular relationships to one another respectively at the points of location of said universal joint members.

CADWALLADER W. KELSEY.